US012673465B2

(12) United States Patent
Nishino

(10) Patent No.: US 12,673,465 B2
(45) Date of Patent: Jul. 7, 2026

(54) MASK MANUFACTURING METHOD AND TOY FIGURE MANUFACTURING METHOD

(71) Applicant: EPOCH COMPANY, LTD., Tokyo (JP)

(72) Inventor: Koichi Nishino, Tokyo (JP)

(73) Assignee: EPOCH COMPANY, LTD., Tokyo (JP)

( * ) Notice: Subject to any disclaimer, the term of this patent is extended or adjusted under 35 U.S.C. 154(b) by 251 days.

(21) Appl. No.: 17/992,116

(22) Filed: Nov. 22, 2022

(65) Prior Publication Data

US 2024/0165525 A1     May 23, 2024

(51) Int. Cl.
| | |
|---|---|
| *B29C 64/393* | (2017.01) |
| *A63H 9/00* | (2006.01) |
| *B29L 31/00* | (2006.01) |
| *B33Y 80/00* | (2015.01) |

(52) U.S. Cl.
CPC ............. *B29C 64/393* (2017.08); *A63H 9/00* (2013.01); *B29L 2031/757* (2013.01); *B33Y 80/00* (2014.12)

(58) Field of Classification Search
CPC .... A63H 9/00; B29L 2031/767; B29C 64/393
See application file for complete search history.

(56) References Cited

U.S. PATENT DOCUMENTS

| | | | |
|---|---|---|---|
| 4,450,129 A | 5/1984 | Dunn et al. | |
| 2018/0015379 A1* | 1/2018 | Pratt | A63H 9/00 |
| 2022/0387900 A1* | 12/2022 | Chan | B41J 3/4073 |

FOREIGN PATENT DOCUMENTS

| | | | | |
|---|---|---|---|---|
| DE | 4240940 A1 * | 6/1994 | ......... | A61F 2/30942 |
| JP | S61-085286 U | 6/1986 | | |
| JP | S61-119291 A | 6/1986 | | |
| JP | H05123456 A * | 11/1991 | | |
| JP | H04-261687 A | 9/1992 | | |
| JP | 6796900 B1 | 12/2020 | | |
| KR | 101937139 B1 | 1/2019 | | |

OTHER PUBLICATIONS

Notice of Reasons for Refusal mailed May 19, 2022 for JP2021-030190.
Sato, Junichi, "Method of producing a coating mask by using a 3d printer," [online], Jul. 3, 2020, CyberAgent,Inc., ameblo, [search on] May 10, 2022, Internet < URL: https://ameblo.jp/hamunobi/entry-12608644068.html >.
Office Action issued on Jan. 17, 2023 for corresponding German Patent Application No. 102022104475.0 with partial English Translation.

* cited by examiner

*Primary Examiner* — Alison L Hindenlang
*Assistant Examiner* — Debjani Roy
(74) *Attorney, Agent, or Firm* — Faegre Drinker Biddle & Reath LLP

(57) ABSTRACT

A mask manufacturing method includes: preparing a base body of a toy figure based on base body data; and scanning the base body with a 3D scanner for acquiring scan data of the base body. The mask manufacturing method further includes: preparing mask mold data based on the scan data, the mask mold data including cover part data indicating a cover part for covering the base body therewith and exposing part data indicating an exposing part for exposing the base body therefrom; and shaping a mask mold with a 3D printer based on the mask mold data.

7 Claims, 10 Drawing Sheets

1(10)

67A

MASK MANUFACTURING METHOD AND TOY FIGURE MANUFACTURING METHOD

TECHNICAL FIELD

The present disclosure relates to a mask manufacturing method and a toy figure manufacturing method.

BACKGROUND ART

Figure manufacturing techniques in which painting is performed using a mask have been proposed. For example, JPS61-119291A discloses a method for manufacturing an electroformed mask for painting a doll. In the method, a dry transfer is applied to a predetermined position of a face of a doll head part in advance, and electroforming plating is then performed using the doll head part to shape an electroformed mold of the doll head part. A transfer part where the shape of the dry transfer has been transferred with a different glossiness from the other part is excised to produce a doll.

SUMMARY OF INVENTION

Such an electroformed mask as shown in JPS61-119291A may be deformed due to abrasion or the like after repeated use. Thus, a new mask has to be prepared, or a plurality of masks have to be prepared in advance for some number of dolls to be manufactured. However, in the method in which the electroformed mask is prepared from the electroformed mold, it may be difficult to control the thickness of the mask, or some step such as the step of excising the transfer part may be performed manually, causing a variation in shape or the like from one electroformed mask to another. Therefore, the painting quality in the figures such as dolls is not stable.

It is an object of the present disclosure to provide a mask manufacturing method and a toy figure manufacturing method capable of painting with stable quality.

In view of the above, a mask manufacturing method according top claim 1 and a toy figure manufacturing method according to claim 6 are provided.

A mask manufacturing method according to one aspect of the present disclosure is includes: preparing, such as forming, a base body of a toy figure based on base body data which may be provided beforehand; scanning the base body with a 3D scanner for acquiring scan data of the base body; preparing mask mold data based on the scan data, the mask mold data including cover part data indicating a cover part for covering the base body therewith and exposing part data for forming an exposing part for exposing the base body therefrom; and shaping a mask mold with a 3D printer based on the mask mold data.

A toy figure manufacturing method according to another aspect of the present disclosure includes: preparing, such as forming, a base body based on base body data which may be provided beforehand; scanning the base body with a 3D scanner for acquiring scan data of the prepared base body; preparing mask mold data based on the scan data, the mask mold data including cover part data indicating a cover part for covering the base body therewith and exposing part data indicating an exposing part for exposing the base body therefrom; shaping a mask mold with a 3D printer based on the mask mold data; and painting the base body, or another base body which has been formed based on the base body data, to which the mask mold is attached.

According to the aforementioned aspects, it is possible to provide a mask manufacturing method and a toy figure manufacturing method capable of painting with stable quality.

BRIEF DESCRIPTION OF DRAWINGS

The disclosure is now described with reference to the drawings without being limited thereto.

DESCRIPTION OF EMBODIMENTS

Figure 1:
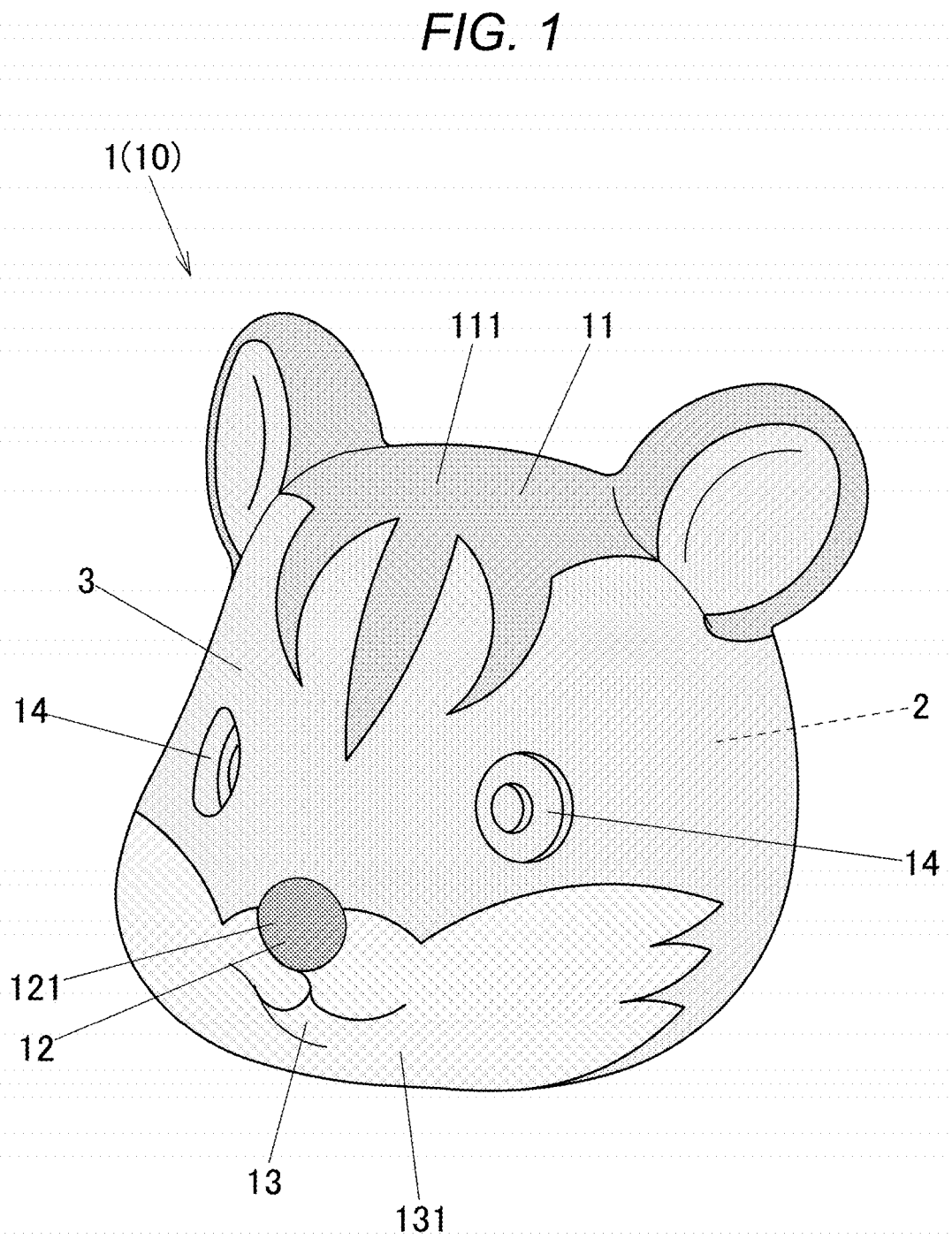
FIG. 1 is a perspective view of a figure body that constitutes a part of a toy figure according to an embodiment of the present disclosure.

An embodiment of the present disclosure will be described below with reference to the drawings. FIG. 1 is a view showing a figure body 1 that constitutes a part of a toy FIG. 10. The figure body 1 imitates a head part of a squirrel. The figure body 1 can be combined with other parts including a trunk part, arm parts, foot parts, etc. to thereby constitute the toy FIG. 10 (whose entire shape is not shown). The figure body 1 is covered with a flocked part 3 all over the circumference of a base body 2 which will be described later, or over an exposed part of the toy FIG. 10. The flocked part 3 has been flocked with hair. The figure body 1 has colored parts 111, 121 and 131 in parts of vicinities of a head part 11, a nose part 12 and a mouth part 13. The base body 2 (or the flocked base body) of the figure body 1 is covered with a mask mold 7 (or a mask mold 6) of a mask jig 80 including exposing parts 75 (715 and 725) and 712 (or an exposing part 65), and sprayed with paint. Thus, the colored parts 111, 121 and 131 are colored.

Figure 2:
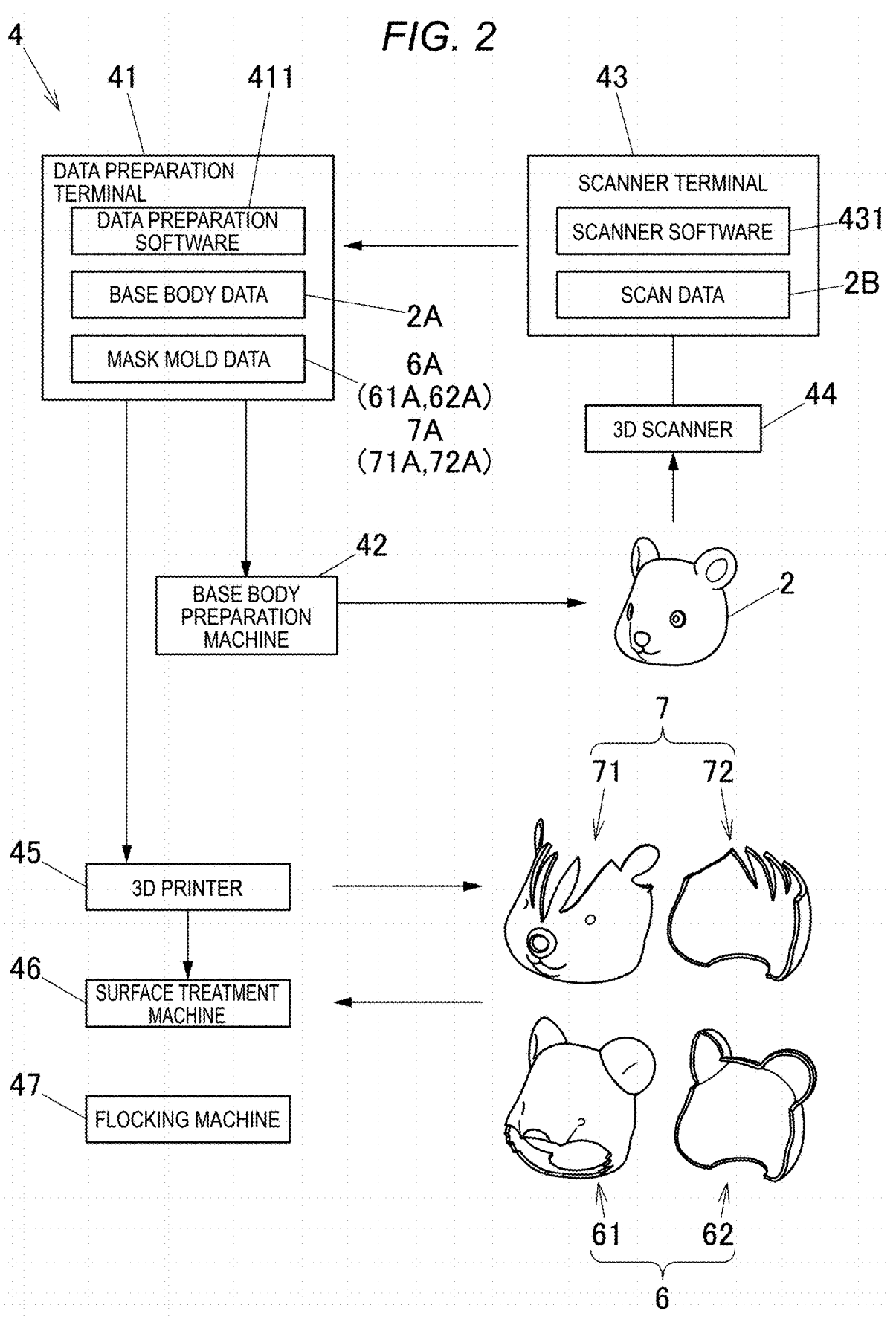
FIG. 2 is an overall configuration view of a toy figure manufacturing system according to the embodiment of the present disclosure.

FIG. 2 is an overall configuration view of elements in a toy figure manufacturing system 4 according to the embodiment. The toy figure manufacturing system 4 includes a data preparation terminal 41, a base body preparation machine 42, a scanner terminal 43 for controlling a 3D scanner 44, a 3D printer 45, a surface treatment machine 46, and a flocking machine 47.

The data preparation terminal 41 has data preparation software 411 that can prepare and edit 3D data (base body data 2A and mask mold data 6A and 7A) of the base body 2, mask molds 6 and 7, etc. Any CAD software may be used as the data preparation software 411. The base body data 2A and the mask mold data 6A and 7A can be stored in a desired storage portion within the data preparation terminal 41. The data preparation terminal 41 includes a processor and a memory storing the data preparation software 411 having instructions that, when executed by the processor, cause the data preparation terminal 41 to perform operations including preparing and/or editing the 3D data.

The base body preparation machine 42 can prepare the base body 2 based on the base body data 2A prepared by the data preparation software 411 (or with a mold prepared based on the base body data 2A). The base body preparation machine 42 according to the embodiment is a shaping machine that can perform resin molding such as slush molding or blow molding.

The scanner terminal 43 includes scanner software 431 that can control the 3D scanner 44 so as to edit scan data 2B acquired by the 3D scanner 44. The scan data 2B can be stored in a desired storage portion within the scanner terminal 43. Incidentally, the scanner software 431 may be constituted by a plurality of software pieces having a function of controlling the 3D scanner 44 and a function of editing the scan data 2B individually. The scanner terminal 43 includes a processor and a memory storing the scanner software 431 having instructions that, when executed by the processor, cause the scanner terminal 43 to perform operations including controlling the 3D scanner 44.

The 3D printer 45 can be a metal 3D printer using stainless steel, which is a metal, as a shaping material. A powder bed system (powder bed fusion) such as a laser beam system (for example, selective laser melting (SLM) or selective laser sintering (SLS)) or an electron beam system (electron beam melting) can be applied to the 3D printer 45. Alternatively, a metal deposition system (metal deposition) such as a laser beam system (for example, laser metal deposition (LIVID) or laser engineered net shaping (LENS)) or an arc discharge system may be applied to the 3D printer 45. Examples that can be used as the shaping material include iron, aluminum, titanium, copper, or alloys containing parts of them as main components (for example, a stainless steel alloy having iron as main component). The 3D printer 45 can shape the mask molds 6 and 7 based on the mask mold data 6A and 7A prepared by the data preparation terminal 41.

The surface treatment machine 46 performs coating on the mask molds 6 and 7 shaped by the 3D printer 45 to thereby apply anticorrosion treatment or rust prevention treatment thereto. The coating may be performed by a desired method such as plating, PVD (Physical Vapor Deposition), or CVD (Chemical Vapor Deposition). Electroplating, chemical plating, anodizing, etc. may be applied to the method of plating.

The flocking machine 47 can perform flocking on the external surface (or internal surface in some shape) of the base body 2 so as to implant short fibers formed out of rayon, nylon or the like and having substantially the same color as the base body 2. The flocking in the embodiment is performed by electrostatic flocking in which the short fibers having substantially the same color (for example pale orange) as the base body 2 are attached to the external surface of the base body 2 so as to be raised thereon.

Figure 3:
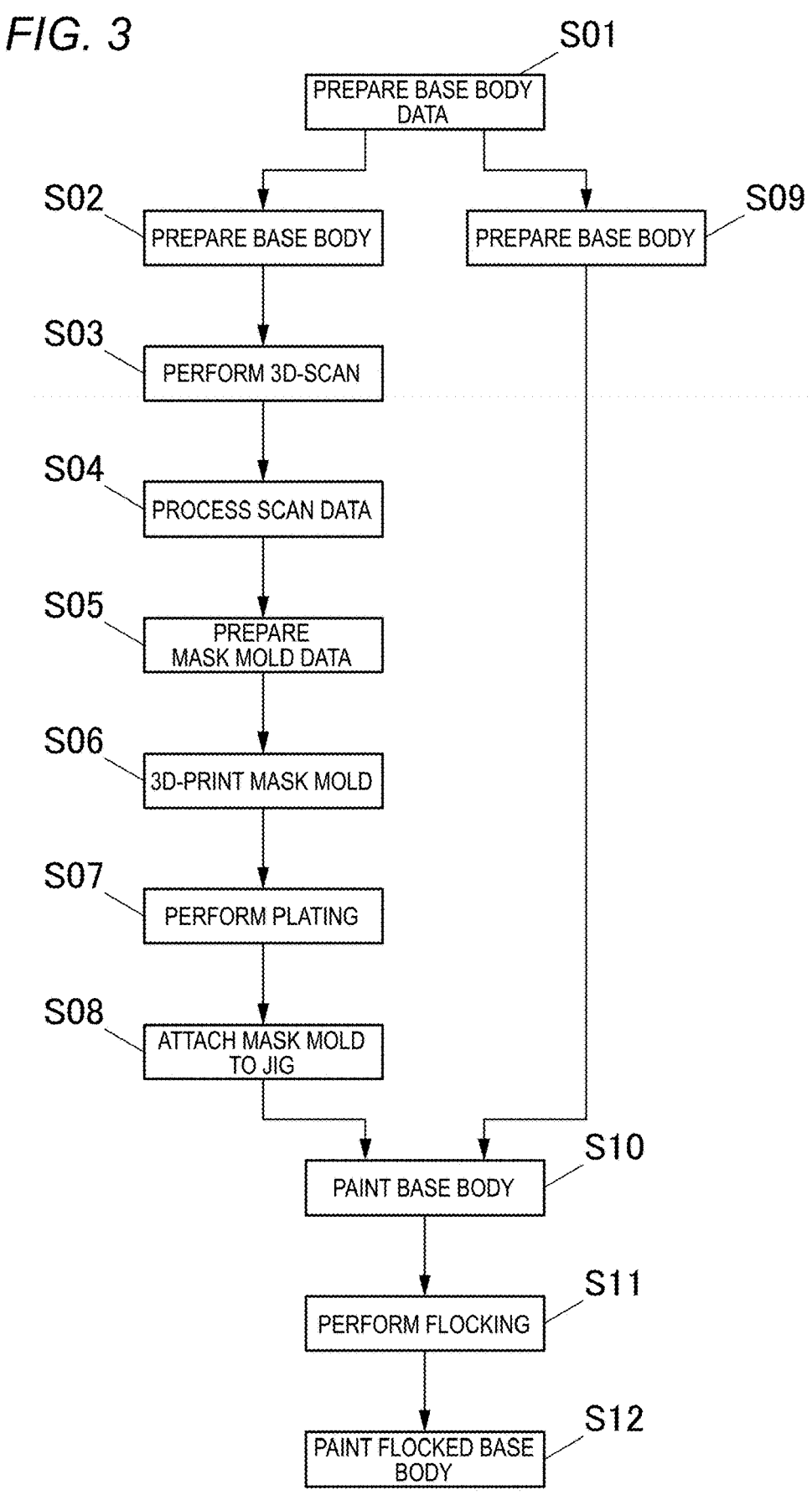
FIG. 3 is a flow chart of the toy figure manufacturing method according to the embodiment of the present disclosure.
Figure 4A:
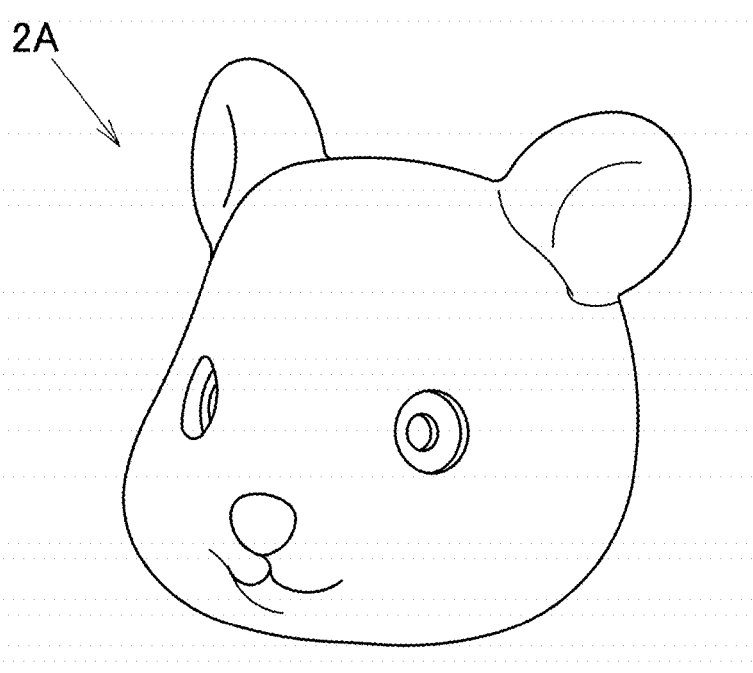
FIGS. 4A and 4B are views showing the toy figure manufacturing method according to the embodiment of the present disclosure, with FIG. 4A showing base body data, and FIG. 4B showing a base body of a figure body retained by a retention member.

Next, the toy figure manufacturing method according to the embodiment will be described. FIG. 3 is a flow chart showing steps in the toy figure manufacturing method (including the mask manufacturing method in Steps S01 to S08). First, in Step S01, the base body data 2A (see FIG. 4A) of the figure body 1 (that is, the head part of the toy FIG. 10) is prepared by the data preparation software 411.

In Step S02, the base body preparation machine 42 prepares the base body 2 of the figure body 1 based on the base body data 2A prepared by the data preparation software 411. The base body preparation machine 42 according to the embodiment prepares the base body 2 by resin molding. Therefore, the prepared base body 2 may contract when the resin material is cooled down. Thus, the base body 2 may be formed to be partially or entirely smaller than the external shape of the base body data 2A, or deformed (for example, the angle of a protruding part such as an ear part 24 in the base body 2 shown in FIG. 4B may differ from that of an ear part data 2A4 of the base body data 2A). The position where a difference occurs between the base body data 2A and the base body 2 or the degree of the difference depends on the shape, size, thickness, material, etc. of the base body 2 to be prepared.

Figure 4B:
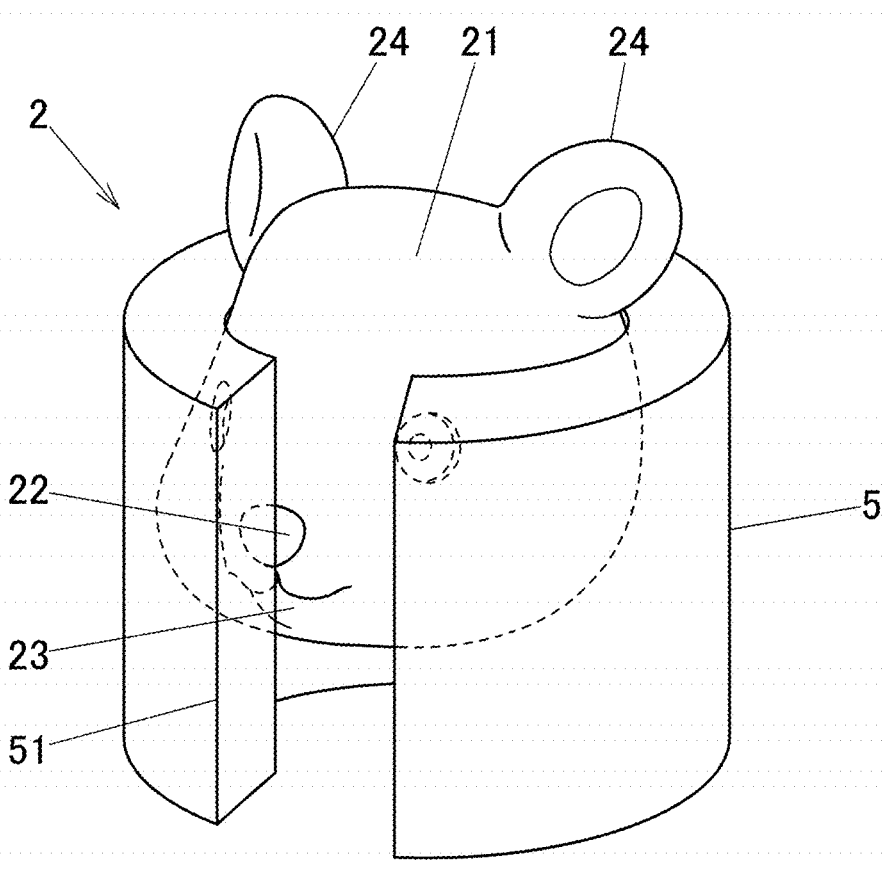

In Step S03, the scanner terminal 43 performs 3D scan on the solid shape of the base body 2 with the 3D scanner 44 to acquire the scan data 2B (3D data). The 3D scan on the base body 2 is performed by CT scan using X-rays, for example, as shown in FIG. 4B, in which the outer circumference of the base body 2 is retained by a cylindrical retention member 5 partially provided with a slit 51 to have a cross-sectional shape like a C-ring. A material different in CT value from the base body 2 enough to be distinguished therefrom can be used for the retention member 5. The scanner terminal 43 can acquire the external shape or internal shape of the base body 2 from the 3D scanner 44.

Figure 5A:
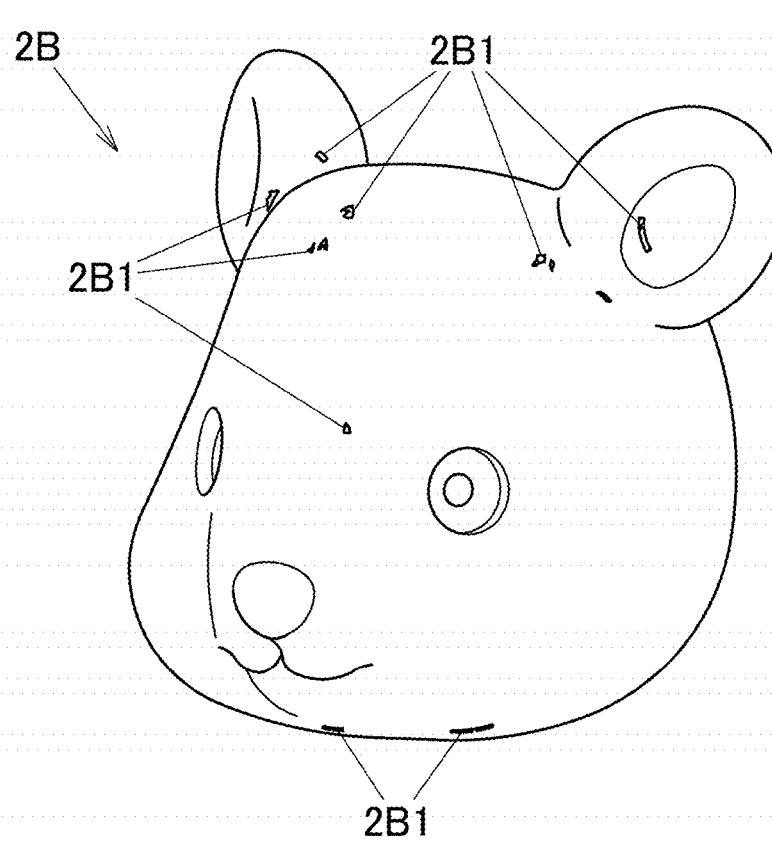
FIGS. 5A and 5B are views showing the toy figure manufacturing method according to the embodiment of the present disclosure, with FIG. 5A showing scan data that has not been corrected yet, and FIG. 5B showing the scan data that has been corrected.

FIG. 5A is a view showing the scan data 2B of the base body 2 acquired in Step S03. The scan data 2B has substantially the same size, the same external shape and the same internal shape including irregularities as the base body 2 prepared based on the base body data 2A. Incidentally, as shown in FIG. 5A, the scan data 2B may include noise 2B1. The noise 2B1 includes irregular parts, surface crack or chip parts, etc. that do not appear on the base body 2 but are present on the scan data 2B.

Figure 5B:
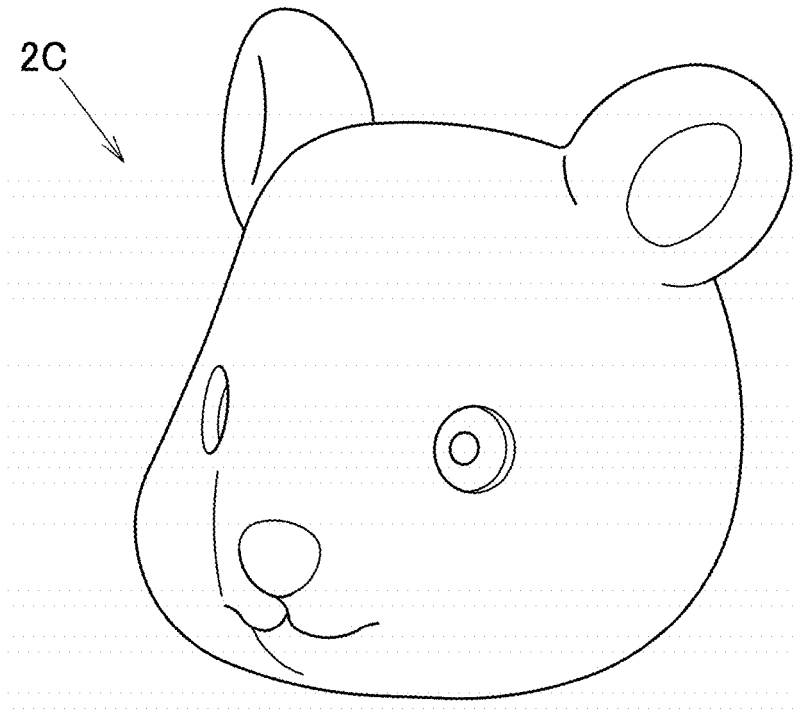

In Step S04, the noise 2B1 of the scan data 2B is eliminated manually or automatically by use of the scanner software 431. Due to the elimination of the noise 2B1, scan data 2C (see FIG. 5B) having a shape closer to the base body 2 than the base body data 2A or the scan data 2B that has not been corrected yet can be obtained.

Figure 6:
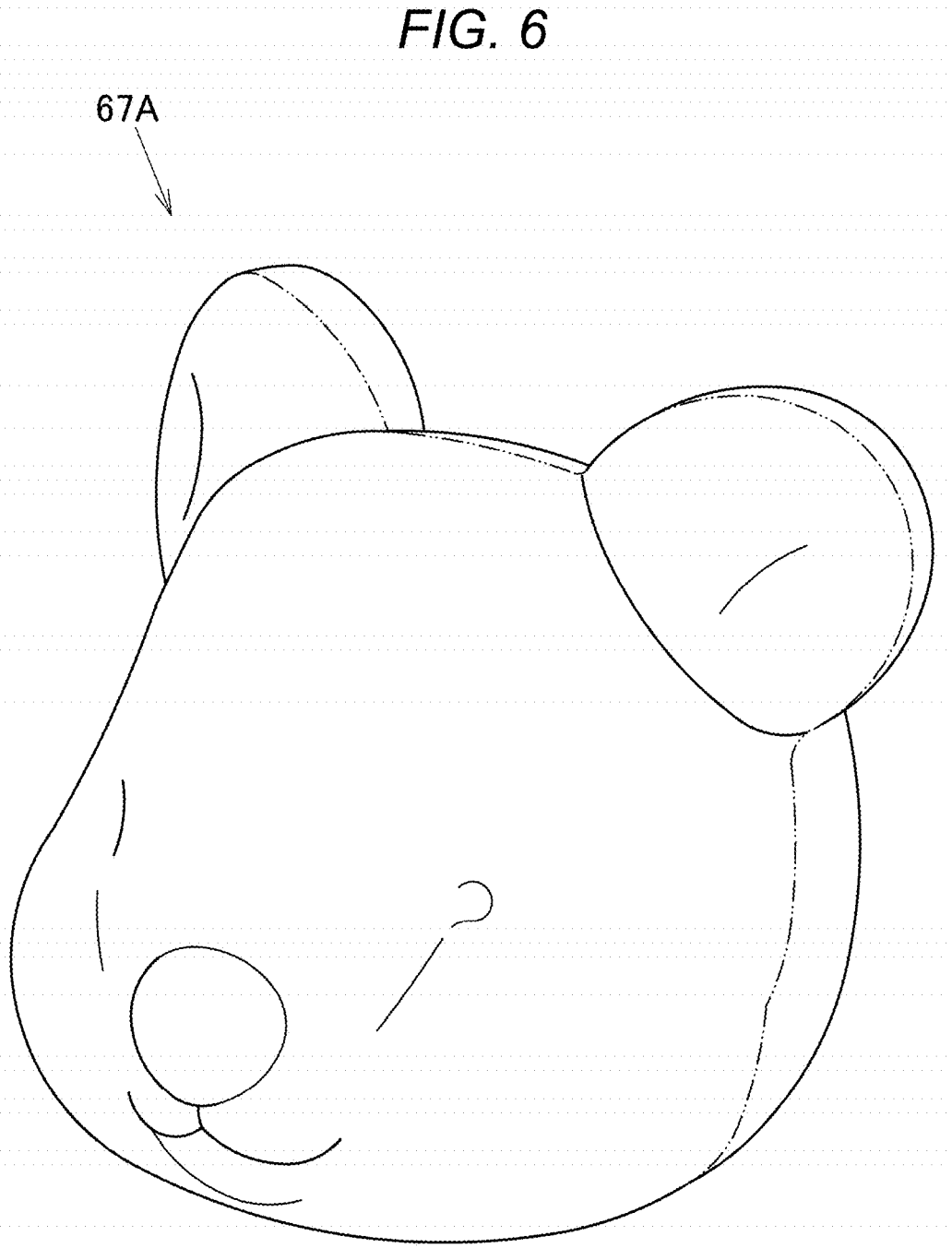
FIG. 6 is a view showing inverted data according to the embodiment of the present disclosure.

In Step S05, the mask mold data 6A and 7A are prepared using the scan data 2C by the data preparation software 411 (see the respective explored perspective views of FIG. 7A, FIG. 7B, FIG. 8A and FIG. 8B). First, the data preparation software 411 prepares inverted data 67A (see FIG. 6). The internal shape of the inverted data 67A has substantially the same shape (or the same surface) as the external shape of the scan data 2C which has been corrected, and the mask thickness of the inverted data 67A is set at predetermined one (for example, 1 mm). The inverted data 67A is arranged to cover the scan data 2C entirely. After that, the inverted data 67A is processed and offset to have an internal shape larger than the external shape of the scan data 2C by flocking thickness T (see FIG. 10A etc.) with which flocking will be performed in Step S11 as described later. For example, the inverted data 67A is expanded so that the interval between the internal surface of the inverted data 67A and the external surface of the scan data 2C reaches about 0.8 mm to 1.0 mm. Incidentally, the flocking thickness T may differ from one portion of the base body 2 to another. The offset quantity corresponding to the flocking thickness T may be set at a value taking the flocking thickness T into consideration. For example, the offset quantity may correspond to an average value or a minimum value of the flocking thickness T in the whole base body 2.

In the embodiment, coloring in two different colors is performed. Therefore, the data preparation software 411 prepares the mask mold data 6A of the mask mold 6 (see FIG. 10A) for the colored part 131, and the mask mold data 7A of the mask mold 7 (see FIG. 9 and FIG. 10B) for the colored parts 111 and 121.

Figures 7A, 7B:
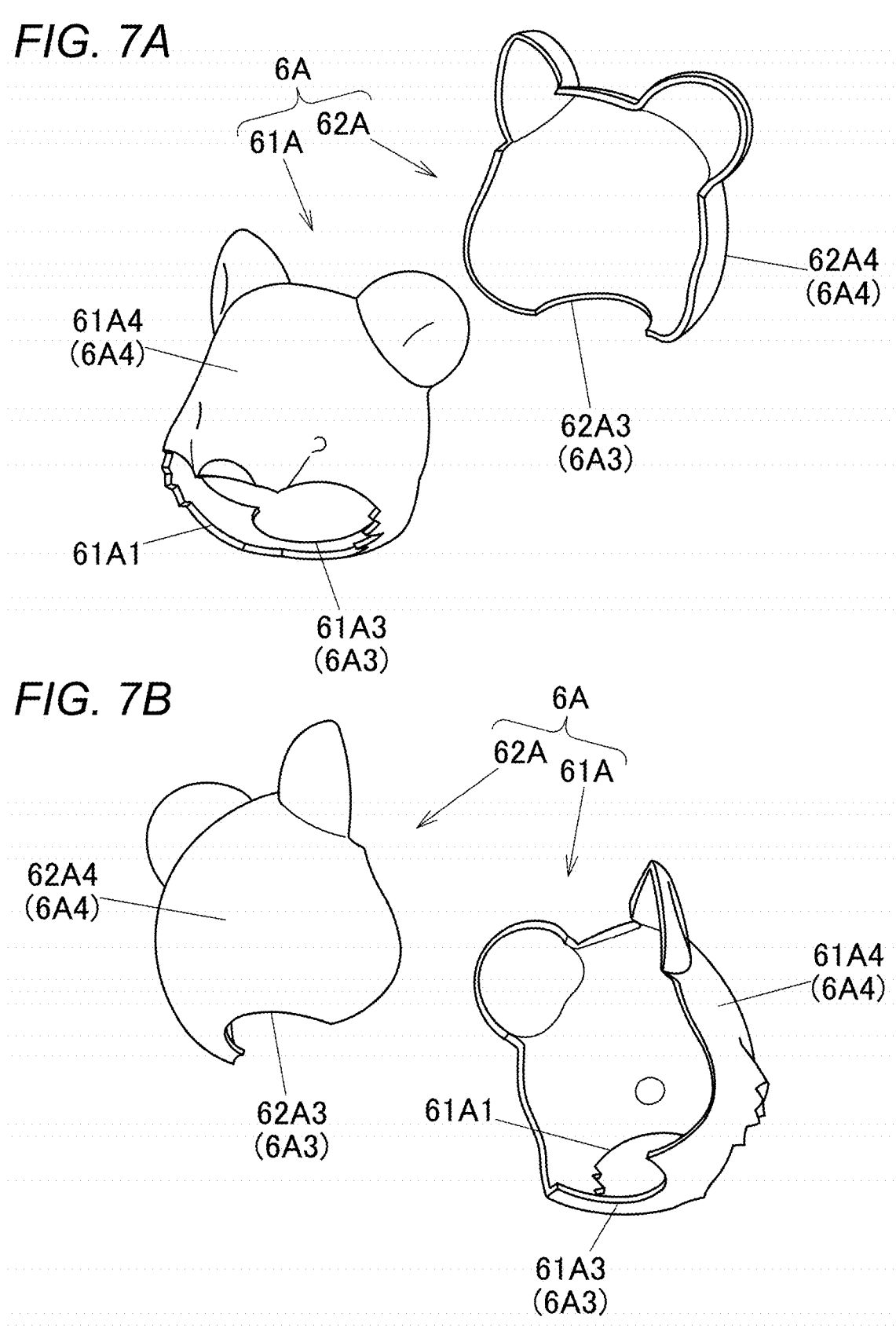
FIGS. 7A and 7B are views showing mask mold data according to the embodiment of the present disclosure, with FIG. 7A showing split mask data on the front side of a mouth part, and FIG. 7B showing split mask data on the rear side of the mouth part.

The mask mold data 6A is prepared so that exposing part data 61A1 indicating an exposing part 65 is provided on the aforementioned inverted data 67A processed and offset by the quantity corresponding to the flocking thickness T, and in a region corresponding to the vicinities of a mouth part 23 (13) of the figure body 1 (see FIG. 1) that is a part to be colored. In addition, the mask mold data 6A is divided into split mask mold data 61A and 62A indicating a plurality of split mask molds 61 and 62 so that the mask mold 6 can be removably attached to the base body 2 from different sides (front and rear sides in the embodiment) of the base body 2. Opening part data 6A3 indicating an opening part 63 of the mask mold 6 corresponding to an opening part 25 (see FIG. 10A) provided in the lower surface of the base body 2 is provided on the lower surface side of the mask mold data 6A. The opening part data 6A3 is formed into a substantially circular shape in which cut part data 61A3 indicating a semicircular cut part 613 and cut part data 62A3 indicating a semicircular cut part 623 are combined as shown in FIGS. 7A and 7B. The exposing part data 61A1 is arranged to indicate the exposing part 65 which is disposed to a part under cheeks and a nose part 22 (12) around the mouth part 23 (13) of the squirrel. The mask mold data 6A (split mask mold data 61A and 62A) prepared thus includes a cover part data 6A4 (61A4 and 624) indicating a cover part 64 (614 and 624) capable of covering the base body 2, and the exposing part data 61A1.

Figures 8A, 8B:
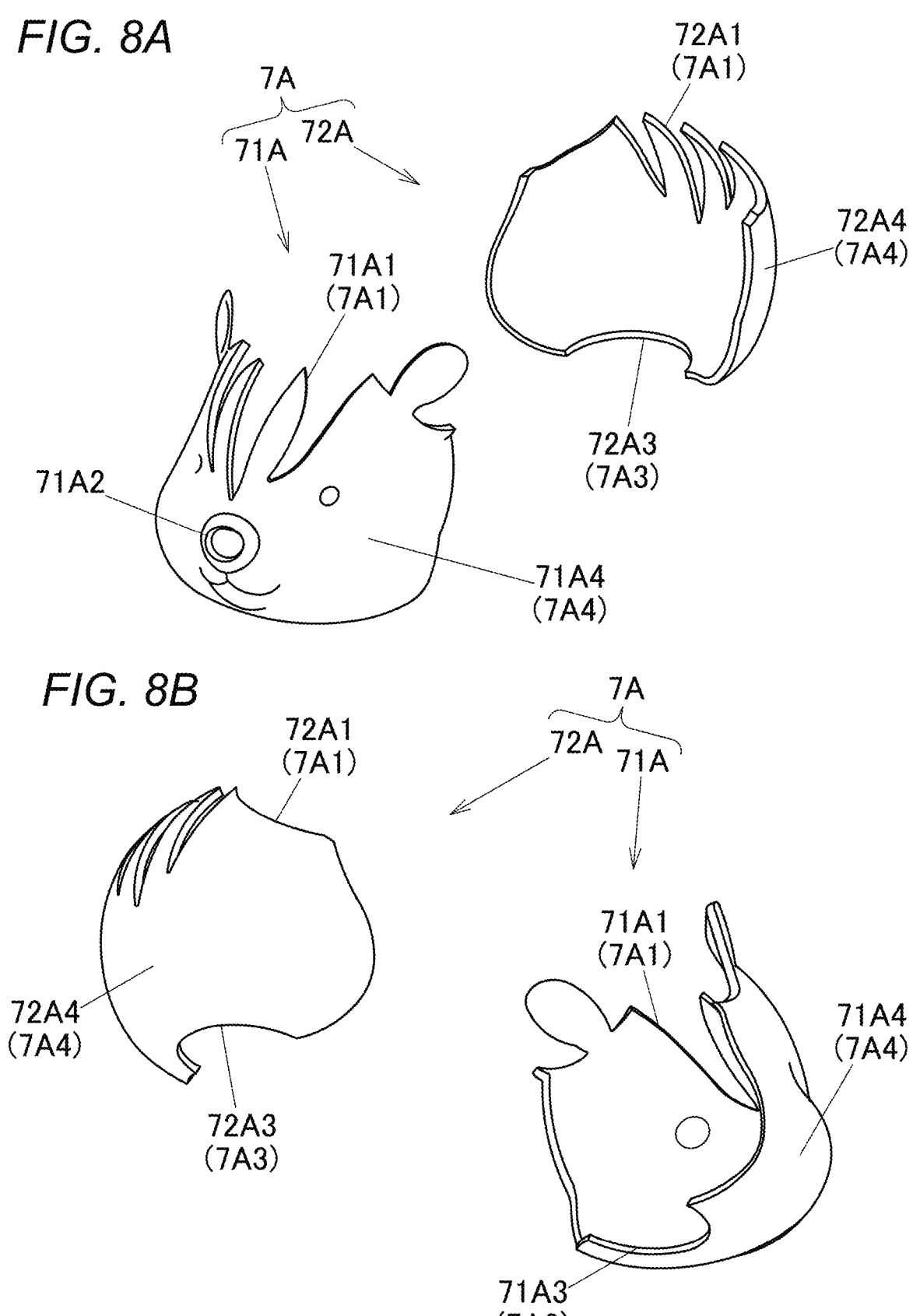
FIGS. 8A and 8B are views showing mask mold data according to the embodiment of the present disclosure, with FIG. 8A showing split mask data on the front side of a head part, and FIG. 8B showing split mask data on the rear side of the head part.

The mask mold data 7A is also prepared in the same manner as the mask mold data 6A. That is, the mask mold data 7A is prepared so that exposing part data 7A1 and 71A2 indicating exposing parts 75 (715 and 725) and 712 is provided on the inverted data 67A processed and offset by the quantity corresponding to the flocking thickness T, and in regions corresponding to a head part 21 (11) and the nose part 22 (12) of the figure body 1 (see FIG. 1) that are parts to be colored. In addition, the mask mold data 7A is divided into a plurality of split mask mold data 71A and 72A so that the mask mold 7 can be removably attached to the base body 2 from different sides (front and rear sides in the embodiment) of the base body 2. Opening part data 7A3 indicating an opening part 73 of the mask mold 7 corresponding to the opening part 25 (see FIG. 10B) provided in the lower surface of the base body 2 is provided on the lower surface side of the mask mold data 7A in the same manner as in the mask mold data 6A. The opening part data 7A3 is formed to define a substantially circular shape in which cut part data 71A3 indicating a semicircular cut part 713 and cut part data 72A3 indicating a semicircular cut part 723 are combined as shown in FIGS. 8A and 8B. The exposing part data 7A1 includes cut part data 71A1 and 72A1 contained in the split mask mold data 71A and 72A, respectively, and the cut part data 71A1 and 72A1 indicate cut parts 715 and 725 formed in respective mating surfaces of the mask mold 7 to be joined to each other. When the split mask mold data 71A and 72A are combined, the exposing part data 7A1 indicate the exposing part 75 of the mask mold 7 arranged as an opening. On the other hand, the exposing part data 71A2 indicates the exposed part 712 as an opening having substantially the same shape as the nose part 22 (12) of the squirrel. The mask mold data 7A (split mask mold data 71A and 72A) prepared thus includes cover part data 7A4 (71A4 and 72A4) indicating a cover part 74 (714 and 724) capable of covering the base body 2, and the exposing part data 7A1 (71A1 and 72A1) and 71A2.

In Step S06, the 3D printer 45 shapes the mask mold 6 and the mask mold 7 based on the mask mold data 6A and the mask mold data 7A prepared thus. As shown in FIG. 2, the mask mold 6 includes a split mask mold 61 shaped by the split mask mold data 61A, and a split mask mold 62 shaped by the split mask mold data 62A. In the same manner, the mask mold 7 includes a split mask mold 71 shaped by the split mask mold data 71A, and a split mask mold 72 shaped by the split mask mold data 72A.

In Step S07, the surface treatment machine 46 performs plating on the mask mold 6 and the mask mold 7. After that, in Step S08, the mask mold 6 and the mask mold 7 are attached to a support member 8 to thereby prepare the mask jig 80.

Figure 9:
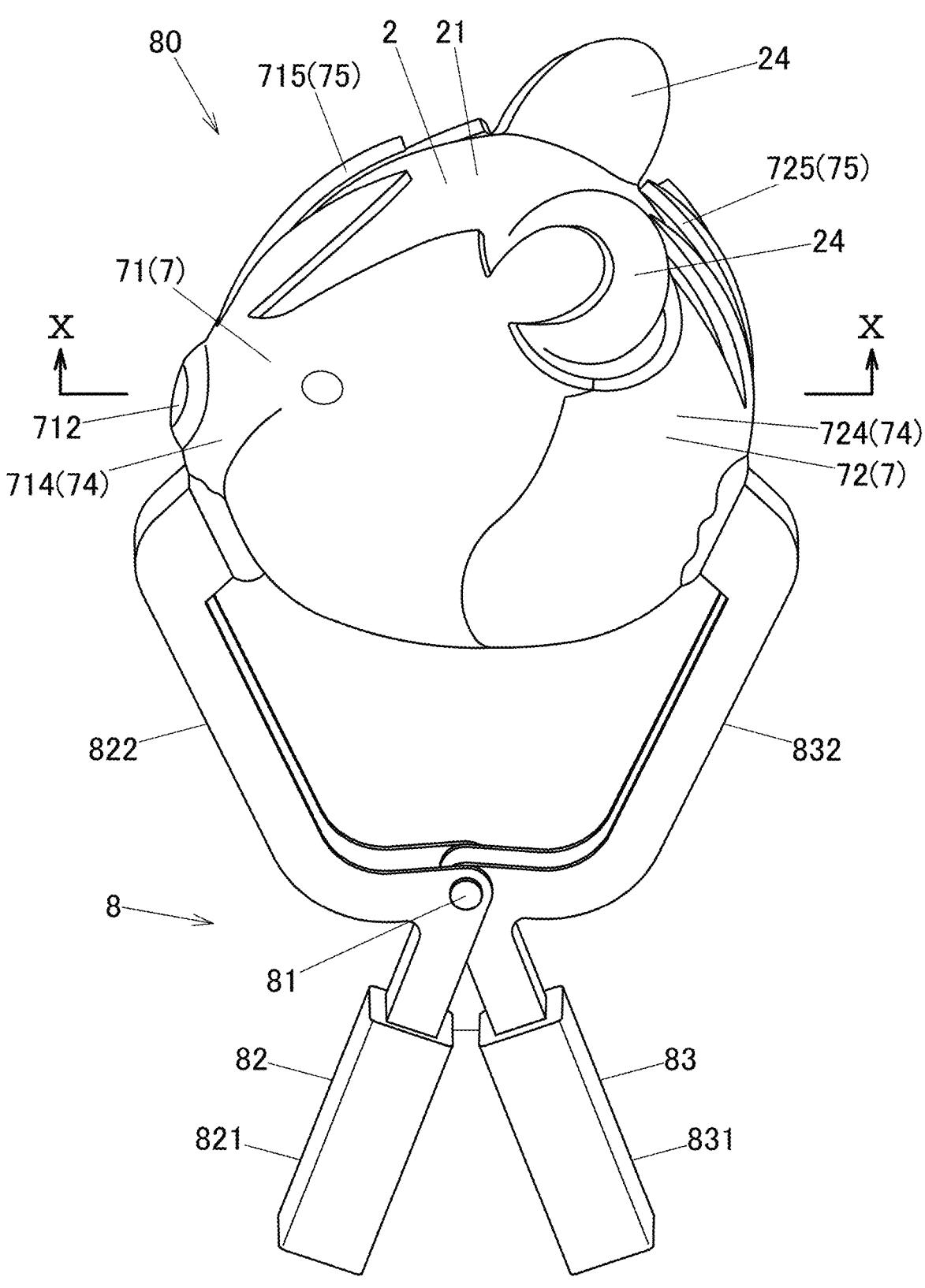
FIG. 9 is a view showing a state in which the base body has been masked with a mask jig according to the embodiment of the present disclosure.

The mask jig 80 in FIG. 9 shows an example in which the mask mold 7 (split mask molds 71 and 72) has been attached to the support member 8. The support member 8 is formed into a large-size clip-like shape. The support member 8 includes a first member 82 and a second member 83 which are connected turnably by a shaft part 81 on the central side. The first member 82 and the second member 83 are provided like long rods. The first member 82 and the second member 83 have grip parts 821 and 831 on one end side with respect to the shaft portion 81. The grip parts 821 and 831 have attachment parts 822 and 832 on the other end side opposite to the grip parts 821 and 831. The split mask mold 71 is attached to the distal end side of the attachment part 822 by welding. On the other hand, the split mask mold 72 is attached to the distal end side of the attachment part 832 by welding. The split mask mold 71 and the split mask mold 72 are welded with the first member 82 and the second member 83 in their lower portions. Accordingly, the first member 82 and the second member 83 are disposed under the split mask mold 71 and the split mask mold 72.

In addition, FIG. 9 shows the mask jig 80 with which painting can be performed around the head part 21 (11) and the nose part 22 (12). In the embodiment, however, a mask jig 80 with which painting can be performed around the mouth part 23 (13) can be prepared when the split mask mold 61 in place of the split mask mold 71 and the split mask mold 62 in place of the split mask mold 72 are attached to the support member 8. The mask jig 80 provided with the split mask mold 61 and the split mask mold 62 is opened in a lower portion of the split mask mold 61. Therefore, the first member 82 and the second member 83 are disposed to be welded with upper portions of the split mask mold 61 and the split mask mold 62 (see FIG. 10A).

In addition, the first member 82 and the second member 83 are urged by a not-shown elastic member so as to separate the grip parts 821 and 831 from each other and to make the attachment parts 822 and 832 close to each other. When a user who grips the grip parts 821 and 831 operates them to approach each other, the split mask mold 71 and the split mask mold 72 can be separated from each other against the elastic force of the elastic member to secure an interval between the split mask molds 71 and 72 so that the base body 2 can be inserted inside the interval.

In Step S09, the base body preparation machine 42 prepares the base body 2, or another base body 2, for manufacturing the figure body 1, based on the base body data 2A prepared in Step S01. That is, the base body data 2A is also used as mass production data for the figure body 1 constituting the toy FIG. 10 e.g., toy doll).

Figure 10A:
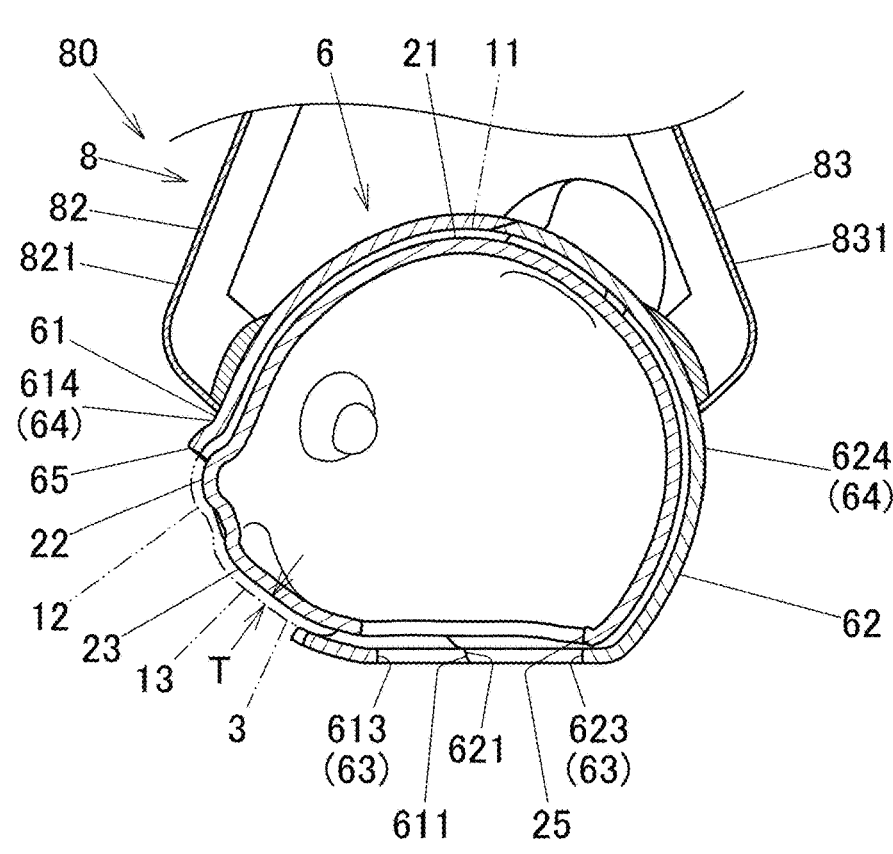
FIGS. 10A and 10B are sectional views of the mask jig and the base body according to the embodiment of the present disclosure, with FIG. 10A being a sectional view taken on line X-X in FIG. 9 where the base body has been mounted with the mask jig in which the mouth part in FIG. 9 has been opened, and FIG. 10B being a sectional view corresponding to the section taken on line X-X where the base body has been mounted with the mask jig in which the head part and a nose part have been opened.

In Step S10, the base body 2 prepared in Step S09 is painted by use of the mask jig 80. First, as shown in FIG. 10A, the mask jig 80 to which the mask mold 6 has been attached is attached to the base body 2. For specific operation, the user who grips the grip parts 821 and 831 (see FIG. 9) of the mask jig 80 disposes the base body 2 between the split mask mold 61 and the split mask mold 62. On this occasion, the base body 2 is, for example, supported by a supporting jig appropriately inserted into the opening part 25 of the base body 2 through the opening part 63 (613 and 623) of the mask mold 6 (or the opening part 73 (713 and 723) of the mask mold 7 in FIG. 10B). When the grip parts 821 and 831 are then released from the gripping operation in the state where the base body 2 has been disposed between the split mask mold 61 and the split mask mold 62, edge parts 611 and 621 opposed to each other in the split mask mold 61 and the split mask mold 62 (or edge parts 711 and 721 in the split mask mold 71 and the split mask mold 72 in FIG. 10B) approach and join each other to thereby contact each other due to the elastic force of the elastic member (see FIG. 10A). Thus, the mask mold 6 (or the mask mold 7) can be attached to the base body 2 easily.

The mask mold 6 is constituted by a plurality of split mask molds, that is, the split mask mold 61 and the split mask mold 62, which can be attached to the base body 2 from a plurality of directions (front and rear directions of the base body 2 in the embodiment). In addition, the mask mold 6 is disposed to follow the external surface of the base body 2. As a result, a part of the base body 2 corresponding to the cover part 64 (614 and 624) of the mask mold 6 is covered, and the other part of the base body 2 corresponding to the exposing part 65 is exposed. Accordingly, when paint is sprayed onto the base body 2 in the state of FIG. 10A, the paint is applied to the vicinities of the mouth part 23 (including a part of the nose part 22) where the exposing part 65 is disposed. The paint to be applied to the vicinities of the mouth part 23 has been colored in paler color than the ground color of the base body 2. The ground color of the base body 2 in the embodiment is pale orange. The colored part 131 around the mouth part 23 is colored in paler cream than the ground color.

Figure 10B:
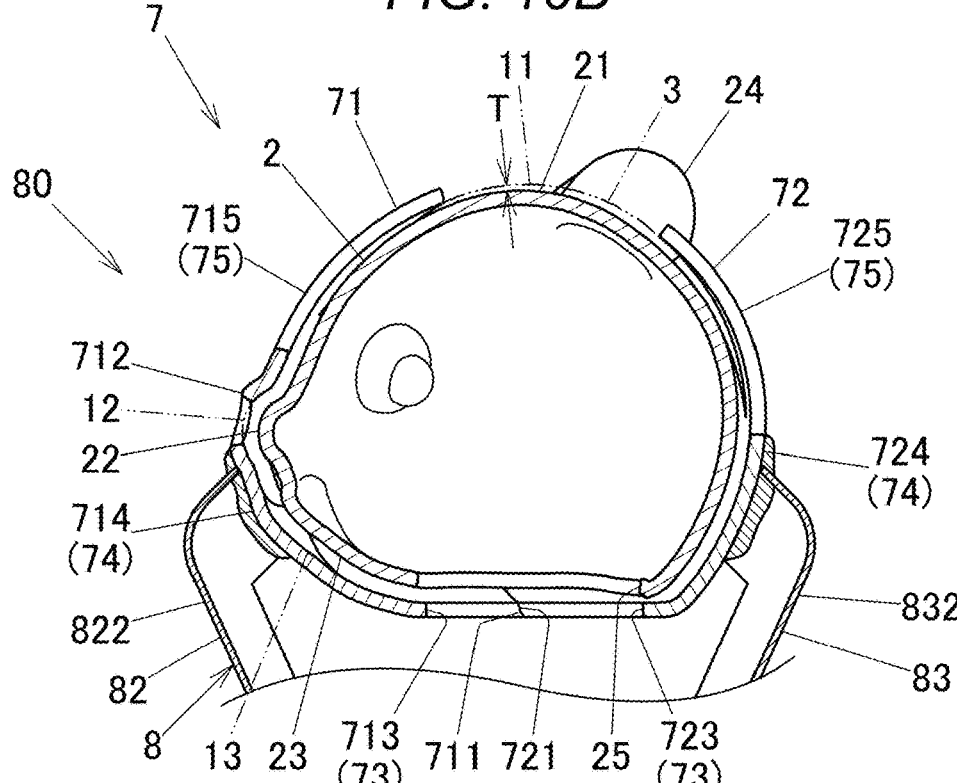

Next, as shown in FIG. 10B, the mask jig 80 to which the mask mold 7 (split mask molds 71 and 72) has been attached is attached to the base body 2. The mask mold 7 is constituted by a plurality of split mask molds, that is, the split mask mold 71 and the split mask mold 72, which can be attached to the base body 2 from a plurality of directions (front and rear directions of the base body 2 in the embodiment). The mask mold 7 is disposed to follow the external surface of the base body 2. As a result, a part of the base body 2 corresponding to the cover part 74 (714 and 724) of the mask mold 7 is covered, and the other part of the base body 2 corresponding to the exposing parts 75 (715 and 725) and 712 are exposed. Accordingly, when paint is sprayed onto the base body 2 in the state of FIG. 10B, the paint is applied to the head part 21 and the nose part 22 where the exposing parts 75 (715 and 725) and 712 are disposed. The paint to be applied to the head part 21 and the nose part 22 has been colored in darker color than the ground color of the base body 2. In the embodiment, the paint has been colored in darker brown than the ground color of the base body 2 and the colored part 131. In addition, a part of the nose part 22 is colored to overlap the colored part which has been painted by use of the mask mold 6. In this manner, the base body 2 is painted in paler color and then in darker color. After that, the grip parts 821 and 831 are operated to separate the split mask mold 71 and the split mask mold 72 from each other, and the base body 2 is extracted.

In Step S11, the flocking machine 47 performs flocking on the base body 2 which has been colored in Step S10. Thus, the surface of the base body 2 is covered with the flocked part 3 of short fibers. The flocked base body including the base body 2 and the flocked part 3 shown by the two-dot chain line in FIG. 10A (or FIG. 10B) is designed to be slightly larger than the base body 2 by the flocking thickness T.

In Step S12, the flocked base body which has been subjected to flocking in Step S11 is painted in the same color and in the same position as in Step S10. That is, the mask jig 80 to which the mask mold 6 (split mask molds 61 and 62) has been attached is attached to the flocked base body including the base body 2 and the flocked part 3 in the same manner as to the base body 2 in FIG. 10A. The internal surface of the mask mold 6 is disposed to be closer to or in tighter contact to the flocked base body than in the case where the base body 2 is disposed therein. When paint is sprayed onto the flocked base body covered with the mask mold 6, the paint is applied to the vicinities of the mouth part 13 (a region including the mouth part 23 and the flocked part 3) where the exposing part 65 is disposed. The paint used here has the same color as the paint applied to the vicinities of the mouth part 23 in the base body 2 in the embodiment. Thus, the vicinities of the mouth part 13 are colored in paler color than the ground color of the base body 2 and the flocked part 3.

Further, the mask jig 80 to which the mask mold 7 (split mask molds 71 and 72) has been attached is attached to the flocked base body including the base body 2 and the flocked part 3 in the same manner as to the base body 2 in FIG. 10B. The internal surface of the mask mold 7 is disposed to be closer to or in tighter contact to the flocked base body than in the case where the base body 2 is disposed therein. When paint is sprayed onto the flocked base body covered with the mask mold 7, the paint is applied to the head part 11 (a region including the head part 21 and the flocked part 3) and the nose part 12 (a region including the nose part 22 and the flocked part 3) where the exposing parts 75 (715 and 725) and 712 are disposed. The paint used here has the same color as the paint applied to the head part 21 and the nose part 22 in the base body 2 in the embodiment. Thus, the head part 11 and the nose part 12 are colored in darker color than the ground color of the base body 2 and the flocked part 3. In this manner, the flocked base body is also painted in paler color and then in darker color.

In this manner, according to the embodiment, the colored parts 111 and 121 whose color is darker than the ground color are provided in the head part 11 and the nose part 12, and the colored part 131 whose color is paler than the ground color is provided around the mouth part 13, as shown in the figure body 1 of FIG. 1. In addition, in recess parts 14 provided on the front surface side of the figure body 1, harder members (not shown) than the flocked part 3 are disposed by bonding or the like, so as to imitate eyes of the figure body 1. Thus, the flocked part 3 is partially hidden so that the figure body 1 can express the positions of the eyes due to a difference in texture.

According to the embodiment of the present disclosure described above, it is possible to provide a mask manufacturing method and a toy figure manufacturing method as configured below.

A mask manufacturing method according to a first configuration includes: a step of preparing, such as forming, a base body of a toy figure based on base body data which may be provided beforehand; a step of scanning the base body with a 3D scanner for acquiring scan data of the base body; a step of preparing mask mold data based on the scan data, the mask mold data including cover part data indicating a cover part for covering the base body therewith and exposing part data indicating an exposing part for exposing the base body therefrom; and a step of shaping a mask mold with a 3D printer based on the mask mold data.

According to this configuration, the mask molds 6 and 7 suited to the shape of the base body 2 can be prepared even if the prepared base body 2 has different dimensions from the base body data 2A due to contraction or the like. In addition, the shapes etc. of the exposing parts 65, 75 (715 and 725) and 712 formed for painting in the mask molds 6 and 7 can be formed stably. Thus, the painting quality of the figure can be stabilized.

In a mask manufacturing method according to a second configuration, in the step of preparing the mask mold data, the mask mold data is prepared, for example adapted, such that an internal shape of the mask mold represented by the mask mold data is larger than an external shape of the base body represented by the scan data by a flocking thickness for flocking on the base body.

According to this configuration, even the flocked base body in which the flocked part 3 has been formed in the base body 2 can be painted accurately and stably since additional space between the base body and the mask mold is provided by adapting the mask mold data so that the internal shape of the mask mold is larger than the external shape of the base body.

In a mask manufacturing method according to a third configuration, the base body data is also used as mass production data for the toy figure.

According to this configuration, the data serving for preparing the mask molds 6 and 7 and the data serving for mass production of the base body 2 are shared so that the mask molds 6 and 7 can be prepared to have more suitable shapes to the base body 2.

In a mask manufacturing method according to a fourth configuration, the mask mold data includes split mask mold data indicating a plurality of split mask molds attachable to the base body from a plurality of directions, the mask mold includes the plurality of split mask molds that are shaped based on the split mask mold data, and the mask manufacturing method further includes a step of preparing a mask jig in which the split mask molds are attached to a support member.

According to this configuration, the mask molds 6 and 7 can be easily attached even to the base body 2 having a complicated shape, so that the base body 2 or the flocked base body can be painted stably and accurately.

In a mask manufacturing method according to a fifth configuration, the base body has an opening part on a lower surface thereof, and the mask mold data further includes an opening part data indicating an opening part of the mask mold corresponding to the opening part of the base body.

According to this configuration, when the mask jig 80 is attached to the base body 2, it is possible to support the base body 2 by a supporting jig inserted into the opening part 25 of the base body 2.

A toy figure manufacturing method according to a sixth configuration includes: a step of preparing, such as forming, a base body based on base body data which may be provided beforehand; a step of scanning the base body with a 3D scanner for acquiring scan data of the prepared base body; a step of preparing mask mold data based on the scan data, the mask mold data including cover part data indicating a cover part for covering the base body therewith and exposing part data indicating an exposing part for exposing the base body therefrom; a step of shaping a mask mold with a 3D printer based on the mask mold data; and a step of painting the base body, or another base body which has been formed based on the base body data, to which a mask jig prepared by the mask mold is attached.

According to this configuration, the mask molds 6 and 7 suited to the shape of the base body 2 can be prepared even if the prepared base body 2 has different dimensions from the base body data 2A due to contraction or the like. In addition, the shapes etc. of the exposing parts 65, 75 (715 and 725) and 712 formed for painting in the mask molds 6 and 7 can be formed stably. Thus, the painting quality of the toy figure can be stabilized.

A toy figure manufacturing method according to a seven configuration further includes, after the step of painting the base body; a step of flocking the base body to prepare a flocked base body; and a step of painting the flocked base body to which the mask jig is attached.

According to this configuration, defects such as omission of painting can be suppressed to enhance the painting quality on the figure body 1 (toy FIG. 10).

Although the embodiment of the present disclosure has been described, the present disclosure is not limited to the embodiment. Various changes can be made to carry out the disclosure. In the embodiment, a head part of a squirrel is shown as the figure body 1 by way of example. However, the figure body 1 may be formed as a part of a toy figure constituting a part of another animal, human being, or the like. In addition, the embodiment shows an example in which the toy FIG. 10 is constituted by a plurality of figure bodies 1 (a plurality of members including a trunk part, arm parts, foot parts, etc. as well as the head part of FIG. 1). However, the figure body 1 alone may constitute the toy FIG. 10. In addition, the toy FIG. 10 may be formed as a toy imitating another animal than the squirrel, such as a rabbit, a dog, a cat, an elephant, a panda, or a bear.

In addition, the toy figure manufacturing method described in the embodiment may be applied to a method for manufacturing another toy figure (such as a building, a furniture, a piece of tableware, a food, a vehicle, a plant, or a plaything).

In addition, the mask molds 6 and 7 may be shaped by a 3D printer using another material such as resin, plaster or elastomer. However, when a metal 3D printer is used as the 3D printer 45 as in the embodiment, the mask molds 6 and 7 high in strength and excellent in durability can be manufactured.

In addition, the configuration in which the scanner software 431 has a function of controlling the 3D scanner 44 and a function of editing the scan data 2B has been described. However, the function of editing the scan data 2B may be provided in the data preparation software 411.

Moreover, the embodiment has described an example in which the mask mold 6 (or the mask mold 7) is constituted by the two split mask molds 61 and 62 (or the split mask molds 71 and 72). However, the mask mold may be constituted by three or more split mask molds. In addition, when the mask mold is constituted by three or more split mask molds, the split mask molds may be designed to be attached to the base body 2 (or the flocked base body) from three or more different directions.

Further, an island-like cover part may be provided inside an exposing part (for example, the exposing part 65) formed in the mask mold, so as to form a ring-like exposing part. In this case, the island-like cover part may be connected to a connection part provided separately to connect the island-like cover part to another exposing part. In the case where the mask mold is attached to the base body 2 (or the flocked base body), the connection part can be formed into an arched shape (or a U-shape) so that the mask mold can be separated from the base body 2 not to impede painting when paint is sprayed.

What is claimed is:

1. A mask manufacturing method comprising:
preparing a base body of a toy figure based on base body data;
scanning the base body with a 3D scanner for acquiring scan data of the base body;
preparing mask mold data based on the scan data, the mask mold data including cover part data indicating a cover part for covering the base body therewith and exposing part data indicating an exposing part for exposing the base body therefrom; and
shaping a mask mold with a 3D printer based on the mask mold data,
wherein the base body has an opening part on a lower surface thereof and between a front side and a rear side of the base body,
wherein the mask mold has an opening part on a lower surface thereof and between a front side and a rear side of the mask mold,
wherein the opening part of the mask mold corresponding to the opening part of the base body, and
wherein a mask jig is inserted into the opening part of the base body through the opening part of the mask mold.

2. The mask manufacturing method according to claim 1, wherein in the preparing the mask mold data, the mask mold data is prepared such that an internal shape of the mask mold represented by the mask mold data is larger than an external shape of the base body represented by the scan data by a flocking thickness for flocking on the base body.

3. The mask manufacturing method according to claim 1, wherein the base body data is also used as mass production data for the toy figure.

4. The mask manufacturing method according to claim 1, wherein the mask mold data includes split mask mold data indicating a plurality of split mask molds attachable to the base body from a plurality of directions,
wherein the mask mold includes the plurality of split mask molds that are shaped based on the split mask mold data, and
wherein the mask manufacturing method further comprises preparing the mask jig in which the split mask molds are attached to a support member.

5. The mask manufacturing method according to claim 1, wherein the mask mold data further includes an opening part data indicating an opening part of the mask mold corresponding to the opening part of the base body.

6. A toy figure manufacturing method comprising:
preparing a base body based on base body data;
scanning the base body with a 3D scanner for acquiring scan data of the prepared base body;
preparing mask mold data based on the scan data, the mask mold data including cover part data indicating a cover part for covering the base body therewith and exposing part data indicating an exposing part for exposing the base body therefrom;
shaping a mask mold with a 3D printer based on the mask mold data; and
painting the base body, or another base body which has been formed based on the base body data, to which the mask mold is attached,
wherein the base body has an opening part on a lower surface thereof and between a front side and a rear side of the base body,
wherein the mask mold has an opening part on a lower surface thereof and between a front side and a rear side of the mask mold,
wherein the opening part of the mask mold corresponding to the opening part of the base body, and
wherein a mask jig is inserted into the opening part of the base body through the opening part of the mask mold.

7. The toy figure manufacturing method according to claim 6, further comprising, after the painting the base body:
flocking the base body to prepare a flocked base body; and
painting the flocked base body to which the mask mold is attached.

* * * * *